United States Patent [19]

Satomi et al.

[11] Patent Number: 5,086,455
[45] Date of Patent: Feb. 4, 1992

[54] FACSIMILE ARRANGEMENT HAVING AUTOMATIC ANSWERING TELEPHONE SET AND FACSIMILE SET AND SWITCHING PROCESS THEREFOR

[75] Inventors: Mitsuo Satomi; Akio Nomura, both of Kyoto; Kazuaki Oshita, Hirakata; Tetsuya Kuwahara, Takashima, all of Japan

[73] Assignee: Murata Kikai Kabushiki Kaisha, Kyoto, Japan

[21] Appl. No.: 492,730

[22] Filed: Mar. 13, 1990

[30] Foreign Application Priority Data

Mar. 16, 1989 [JP] Japan ................................. 1-65266

[51] Int. Cl.[5] ........................ H04N 1/32; H04M 11/00
[52] U.S. Cl. ....................................... 379/100; 379/67
[58] Field of Search ......................... 379/100, 102, 67

[56] References Cited

U.S. PATENT DOCUMENTS

| 4,794,637 | 12/1988 | Hashimoto | 379/100 |
| 4,800,439 | 1/1989 | Yoshino | 379/100 |
| 4,868,865 | 9/1989 | Ogawa et al. | 379/100 |
| 4,939,772 | 7/1990 | Goto | 379/100 |

FOREIGN PATENT DOCUMENTS

| 0281655 | 12/1987 | Japan | 379/100 |
| 0281657 | 12/1987 | Japan | 379/100 |
| 0263966 | 10/1988 | Japan | 379/100 |

Primary Examiner—James L. Dwyer
Assistant Examiner—Stella L. Woo
Attorney, Agent, or Firm—Spensley Horn Jubas & Lubitz

[57] ABSTRACT

A facsimile arrangement comprises a reception mode switching device adapted to connect a telephone line to the automatic answering telephone set upon detection of an incoming call signal regardless of whether a calling party is sending speech or a facsimile message and a detection device adapted to detect a signal from the calling party's facsimile. The reception mode switching device disconnects the telephone line from the automatic answering telephone set and then connects the telephone line with the facsimile set when the signal from the calling party's facsimile is detected. The calling party does not have to wait for a while when the calling party wants to leave a message since the automatic answering telephone set starts always prior to facsimile unit.

8 Claims, 6 Drawing Sheets

FACSIMILE ARRANGEMENT HAVING AUTOMATIC ANSWERING TELEPHONE SET AND FACSIMILE SET AND SWITCHING PROCESS THEREFOR

BACKGROUND OF THE INVENTION

1. Technical Field

The present invention relates to a facsimile arrangement having an automatic answering telephone/facsimile switching function.

2. Background Art

Some recent facsimile arrangements posses automatic answering telephone sets as well as facsimile sets. The automatic telephone set and facsimile set are selectively connected with a telephone line and the change over is carried out manually or automatically.

FIG. 6 is a timing chart illustrating procedures of reception-change-over according to a conventional facsimile arrangement having an automatic answering telephone/facsimile switching function. As shown in FIG. 6(a), when a call signal from a calling party is received by a called party's side via a telephone line LINE, the facsimile arrangement on the called party's side first sends a predetermined response message to the calling party's side, and then sends a called station identification signal CED, a digital identification signal DIS and a group identification signal GI. Upon receiving these signals, the calling party's side sends a digital command signal DCS. After detecting a calling tone CNG or DCS, the facsimile arrangement on the called party's side is set on standby for reception.

Meanwhile, when CNG or DCS is not sent, i.e., when the calling party's side transmits speech (human voice), the facsimile unit causes the automatic answering telephone set TEL2 to ring a predetermined number of times (four times in the illustrated example), as shown at R in FIG. 6(b). After four times of ringing, the automatic answering telephone set starts recording, as shown in FIG. 6(c). Apparent from FIG. 6, there is a time lag T from the reception of calling until the start of recording since the automatic answering telephone set is set to ring four times before recording, as shown in FIG. 6(c). Therefore, the calling party has to wait for a while.

It goes without saying that the number of ringings of the automatic answering telephone set varies with type of automatic answering telephone set. Nevertheless, the fact that the waiting time corresponding to the number of ringings equally applies to any conventional automatic answering telephone sets as long as the incoming signal is transferred to the automatic answering telephone set via the facsimile unit.

SUMMARY OF THE INVENTION

Accordingly, one object of the present invention is to provide a facsimile arrangement having automatic answering telephone and facsimile functions which is capable of reducing a waiting time required for recording by an automatic answering telephone set as much as possible and of improving the operation efficiency as a result.

To this end, in accordance with one aspect of the present invention, there is provided a facsimile arrangement comprising: relay means adapted to connect a telephone line to the automatic answering telephone set upon detection of an incoming call signal from a party, regardless of whether the calling party is sending speech or a facsimile message; detection means adapted to detect, concurrently with the connection or after a certain time interval, a ringing tone transmitted by the calling party's side when the calling party is sending the facsimile message; and switching means adapted to switch the reception mode to the facsimile unit upon detecting the ringing tone representing the facsimile message. Therefore, in a case where the calling party is sending speech, recording by the automatic answering telephone set can be effected immediately.

Since the automatic answering telephone set can start recording immediately when the calling party is sending speech, the time lag which constitutes a problem in the above-described conventional art can be reduced to zero.

DESCRIPTION OF THE PREFERRED EMBODIMENTS

Referring now to the accompanying drawings, a description will be given of an embodiment of the present invention.

Figure 1:
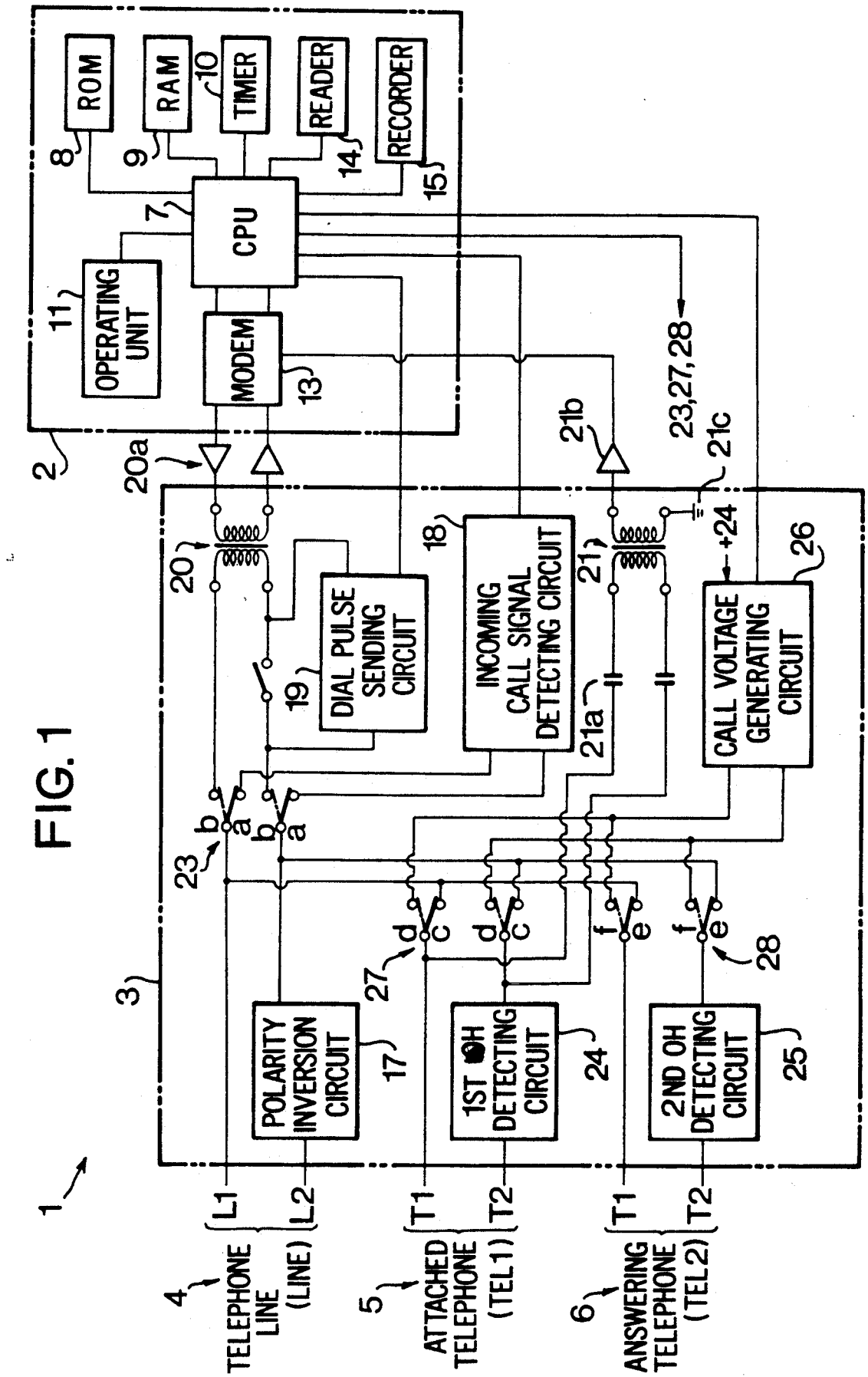
FIG. 1 is a block diagram illustrating an overall configuration of a facsimile arrangement having automatic answering telephone and facsimile functions in accordance with the present invention.

As shown in FIG. 1, the facsimile arrangement 1 comprises a facsimile unit 2 having transmitting and receiving functions peculiar to facsimile arrangement, and a network control unit NCU 3 controlling the connection between a telephone line 4 and the facsimile unit 2. An attached telephone set 5 and an automatic answering telephone set 6 are connected to the NCU 3, respectively. The attached telephone set 5 has an ordinary telephone function, while the automatic answering telephone set 6 has an automatic answering telephone recording function.

It should be noted that the automatic answering telephone set 6 is not limited to any particular type, and suffices insofar as it is equipped with the automatic answering telephone recording function by means of IC recording, tape recording, or the like.

A description will now be given of the various parts of the facsimile arrangement. The facsimile 2 is provided with a central processing unit CPU 7 for controlling the overall transmission and reception by the facsimile arrangement 1. The CPU 7 effects control in accordance with an operation program stored in advance in a read-only memory ROM 8. Various data generated as the operation program advances are stored by a random-access memory RAM 9. The facsimile 2 is also provided with a timer 10, an operating unit 11, a modem (a modulator-demodulator) 13, a reader 14 and a recorder 15. The timer 10 sets a certain time corresponding to a recording time of the automatic answering telephone set 6. The operating unit 11 is provided for effecting various inputting operations and has various keys such as a numeric keypad and function keys.

The modem 13 has the function of generating a push tone signal corresponding to the other party's telephone number and modulates transmitting/receiving signals. The reader 14 reads the image of a document set on the facsimile 2 during transmission, converts the image data read into a black and white (light and dark) binary electric signal and outputs the signal to the CPU 7. The recorder 15 prints out on recording paper image data received during reception.

Now, the configuration of NCU 3 will be described. A polarity inversion detecting circuit 17 is adapted to detect the inversion of polarity in a case where an unillustrated telephone exchange-side direct loop is closed. An incoming call signal detecting circuit 18 detects the presence or absence of a call signal of 16 Hz that is sent from a telephone exchange via the line 4, and inputs the detected result to the CPU 7. In a case where the facsimile arrangement 1 is the call originating side, a dial pulse sending circuit 19 sends a dial pulse corresponding to the other party's telephone number via the line 4. This sending operation is controlled by the CPU 7.

A transformer 20 is connected to the modem 13 via an amplifier 20a. The connection between the modem 13 and the line 4 and that between the incoming call signal detecting circuit 18 and the line 4 are selectively made by means of a CML relay switch 23. In other words, when the CML relay switch 23 is changed over to a position a indicated by a solid line in the drawing, a connection between the line 4 and the incoming call signal detecting circuit 18 is made, while when it is changed over to a position b indicated by a dashed line in the drawing, a connection is made between the line 4 and the modem 13 via the transformer 20. The control of the switching position through the CML relay switch 23 is effected by the CPU 7.

The NCU 3 is provided with a first OH (off-hook) detecting circuit 24 for detecting the off-hook state of the aforementioned attached telephone set 5 (the state in which the receiver is picked up) and with a second OH detecting circuit 25 for detecting the off-hook state of the automatic answering telephone set 6 (the state of recording by the automatic answering telephone). A call voltage generating circuit 26 is connected to the attached telephone set 5 and the automatic answering telephone set 6, respectively, in such a manner as to be switchable with respect to the line 4.

The call voltage generating circuit 26 comprises a switching circuit and DC-DC converter (neither are shown) having constant current characteristics with an input voltage of +24 V DC and a maximum output voltage of +180 V DC. Upon receipt of a call command signal of 16 Hz from the CPU 7, the call voltage generating circuit 26 generates a pseudo-call signal to cause the attached telephone set 5 and the automatic answering telephone set 6 to ring, respectively, and when the telephone set 5 or 6 is in the off-hook state, the call voltage generating circuit 26 supplies a constant current of 40–50 mA to the automatic answering telephone set 6.

The changeover between the attached telephone set 5 on the one hand, and the line 4 and the call voltage generating circuit 26 on the other, is effected by the first TEL relay switch 27. In other words, when the TEL relay switch 27 is changed over to a position c indicated by the solid line in the drawing, a connection is made between the attached telephone set 5 and the line 4, while when it is changed over to a position d indicated by the dash line in the drawing, a connection is made between the attached telephone set 5 and the call voltage generating circuit 26.

Likewise, the changeover between the automatic answering telephone set 6 on the one hand, and the line 4 and the call voltage generating circuit 26 on the other, is effected by the second TEL relay switch 28. In other words, when the TEL relay switch 28 is changed over to a position e indicated by the solid line in the illustration, a connection is made between the automatic answering telephone set 6 and the line 4, while when it is changed over to a position f indicated by the dash line in the illustration, a connection is made between the automatic answering telephone set 6 and the call voltage generating circuit 26.

The control of the switching position of the first and second TEL relay switches 27, 28 is effected by the CPU 7 upon receiving on/off state detection signals from the OH detecting circuits 24, 25. For this reason, the signal which has passed through the TEL relay switch 27 is imparted to the transformer 21 via a capacitor 21a, and a signal from one output terminal of the transformer 21 is imparted to the modem 13 via an amplifier 21b and is then sent to the CPU 7. The other output terminal of the transformer 21 is grounded to a grounding terminal 21c. A signal which has passed through the TEL relay switch 28 is imparted to the CPU 7 via the call voltage generating circuit 26.

With the NCU 3 having the above-described configuration, the switching operation between the line 4 on the one hand, and the facsimile 2, the attached telephone set 5 and the automatic answering telephone set 6 on the other, is effected by means of the CML relay switch 23 and the TEL relay switches 27, 28. Incidentally, the relay switches 23, 27, 28 are normally changed over to the standby positions indicated at a, c, e.

Figure 2:
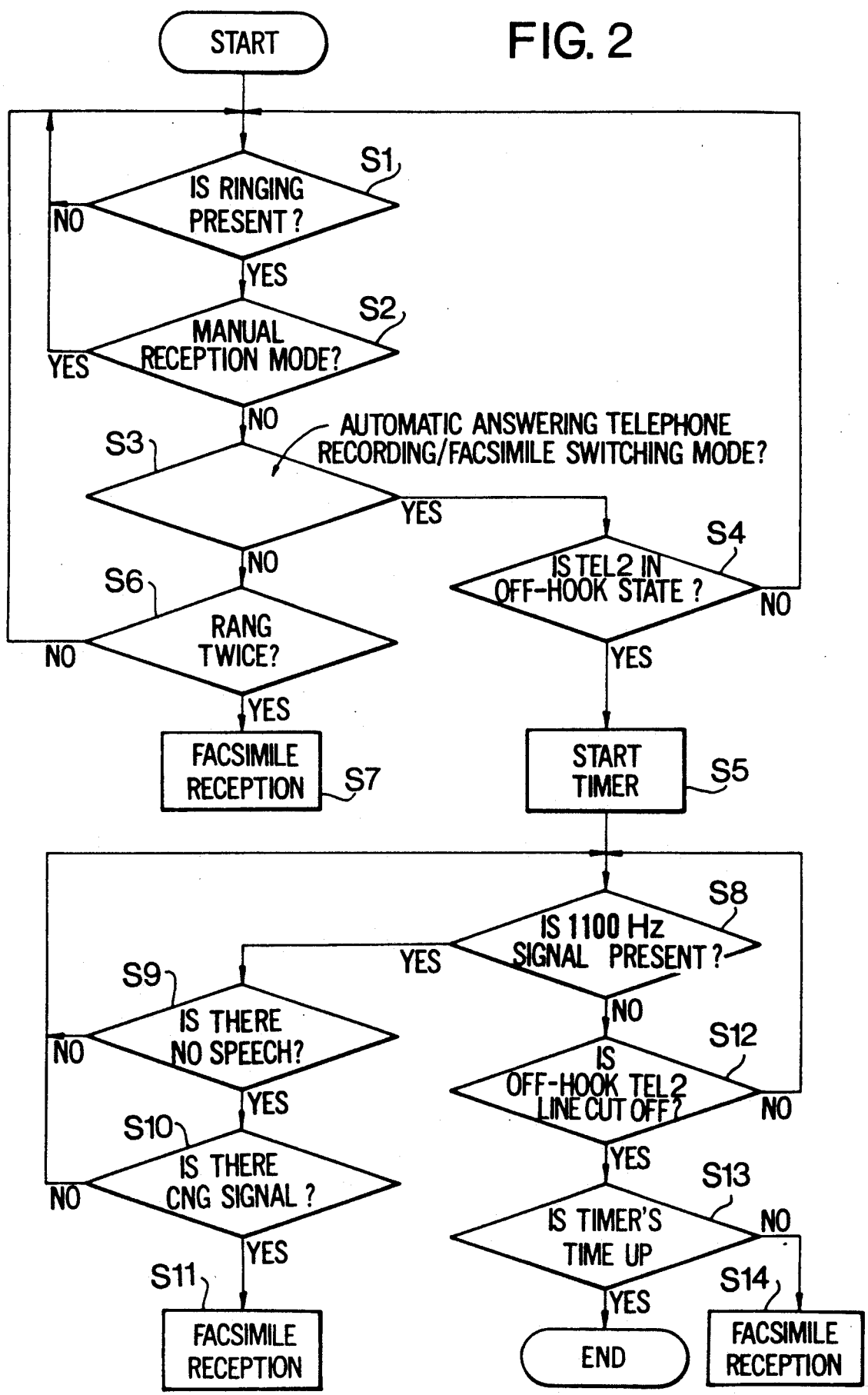
FIG. 2 is a flowchart of a receiving operation of the facsimile arrangement depicted in FIG. 1.

Referring now to the flowchart shown in FIG. 2, a description will be given of the receiving operation of the automatic answering telephone set 6 and the facsimile 2. Here, the switching mode on the operation portion 11 is set to the automatic answering telephone recording/facsimile switching mode.

In the above-described standby state, the CPU 7 first determines whether or not a call signal (ringing signal) of 16 Hz from the calling party's side has been received via the exchange and the line 4 (Step S1). At this juncture, the call signal is detected by the incoming call signal detection circuit 18 which is presently connected to the line 4, and the reception of the incoming call signal is reported to the CPU 7.

Upon confirming the reception of the call signal, the CPU 7 determines whether the reception mode is a manual reception mode or an automatic reception mode (Step S2). Upon confirming that it is the automatic reception mode, the CPU 7 then determines whether or not the TEL relay switch 28 is at the position e and whether or not the switching mode is the automatic answering telephone recording/facsimile switching mode (Step S3).

If the switching mode is not the automatic answering telephone recording/facsimile switching mode, the CML relay switch 23 is switched over to the position b after a predetermined number of ringings (e.g., two ringings) (Step S6), and a speech response message stored in advance in the RAM 9 is read. After the signal representing the response message is converted to a speech signal through the modem 13, the speech signal is output to the line 4 via the NCU 3.

A following message, for example, may be used as the above-mentioned response message: "The line is now connected to facsimile. Please call me back later if you want to talk to me. If you want to send a facsimile message, please press your transmission button after hearing a beep sound." Then, the reception procedures are executed (Step S7). Meanwhile, in a case where the switching mode is the automatic answering telephone recording/facsimile switching mode, the automatic answering telephone set 6 continues to ring (call).

A determination is then made as to whether or not the automatic answering telephone set 6 is in the off-hook state (Step S4). Incidentally, as described above, this off-hook state is detected by the OH detecting circuit 25 and the detected result is reported to the CPU 7. When the off-hook state is confirmed, the operation of the timer 10 is started (Step S5), and the steps which will be described below are executed. In other words, the configuration provided in the present invention is such that when there is a call from a party, the automatic answering telephone set 6 is first called regardless of whether the party is sending speech or a facsimile message, and then the call is received by the automatic answering telephone set 6, i.e., priority is placed on recording by the automatic answering telephone set.

Subsequently, in Step S5, the CPU 7 starts the timer 10 for operating for a specified time (e.g., 30 sec.), and determines whether or not a signal of 1,100 Hz has been received from the calling party (Step S8). If a confirmation is made on the reception of the signal, the CPU 7 first determines whether or not the incoming signal represents human speech (Step S9), and then determines whether or not it is CNG (sent when the calling party is sending a facsimile message) (Step S10).

Figure 3A:
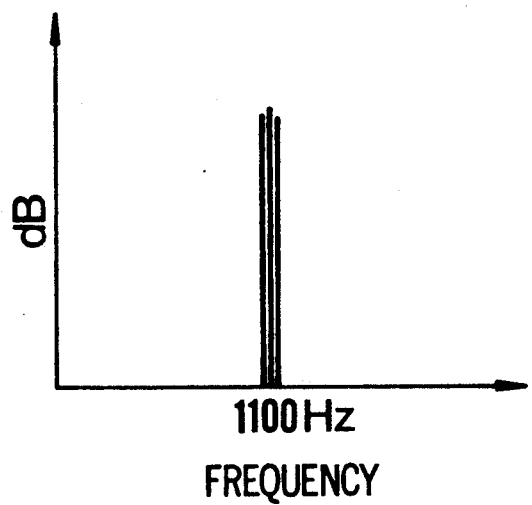
FIGS. 3(a) and 3(b) are diagrams illustrating procedures of discriminating between facsimile message and speech, respectively.
Figure 3B:
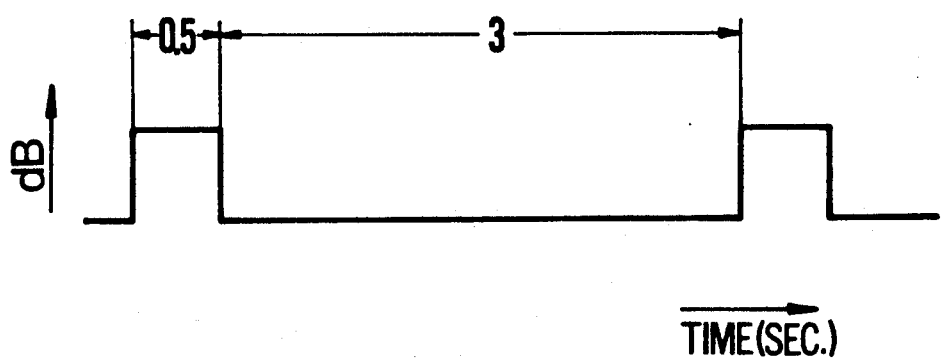

The determination in Step S9 is made on the basis of a frequency band of the incoming signal, as shown in FIG. 3(a). In other words, if the incoming signal is CNG, the frequency band is concentrated in the vicinity of 1,100 Hz, whereas if it is speech, the frequency band is dispersed in a relatively wide range. Therefore, by detecting this difference, it is possible to discriminate between CNG and speech, i.e., to determine the presence or absence of speech.

Meanwhile, as for the determination in Step S10, if the incoming signal is CNG, pulses are sent from the calling party's side regularly for fixed durations (e.g., 0.5 sec. each) at predetermine intervals of time (e.g., 3 sec. each), whereas if it is speech, pulses are sent randomly. Hence, by detecting this difference, it is possible to discriminate between CNG and speech, i.e., determine the presence or absence of CNG.

In a case where a form of detection is adapted for discriminating between CNG and speech in, so to speak, two stages in the manner mentioned above, there is an advantage that the detection can be effected with high accuracy.

Thus, when a confirmation is made that the incoming signal is CNG in Steps S9 and S10, the timer 10 is stopped, and the facsimile arrangement 1 is set to a facsimile receiving mode (Step S11).

On the other hand, if the incoming signal of 1,100 Hz is not detected in Step S8, the automatic answering telephone set 6 is set in the on-hook state, and a determination is made as to whether or not the connection between the automatic answering telephone set 6 and the line 4 has been cut off (Step S12). This on-hook state is detected by the OH detecting circuit 25, and the CPU 7, upon receiving the detected result, switches over the CML relay switch 23 from the position a to the position b, and further switches over the TEL relay switch 28 from the position e to the position f, thereby establishing a connection to the facsimile.

Upon confirming in Step S12 that the connection between the automatic answering telephone set 6 and the line 4 has been cut, the CPU 7 determines whether the specific time of the timer 10 has elapsed (Step S13). Upon convirming that the specific time has not elapsed, the CPU 7 stops the timer 10 and changes the mode to the facsimile reception mode (Step S14). This measure is so designed to enable reception from a facsimile unit operated on a manual-transmission basis since no CNG signal is transmitted if the calling party is using manual transmission.

Figure 4:
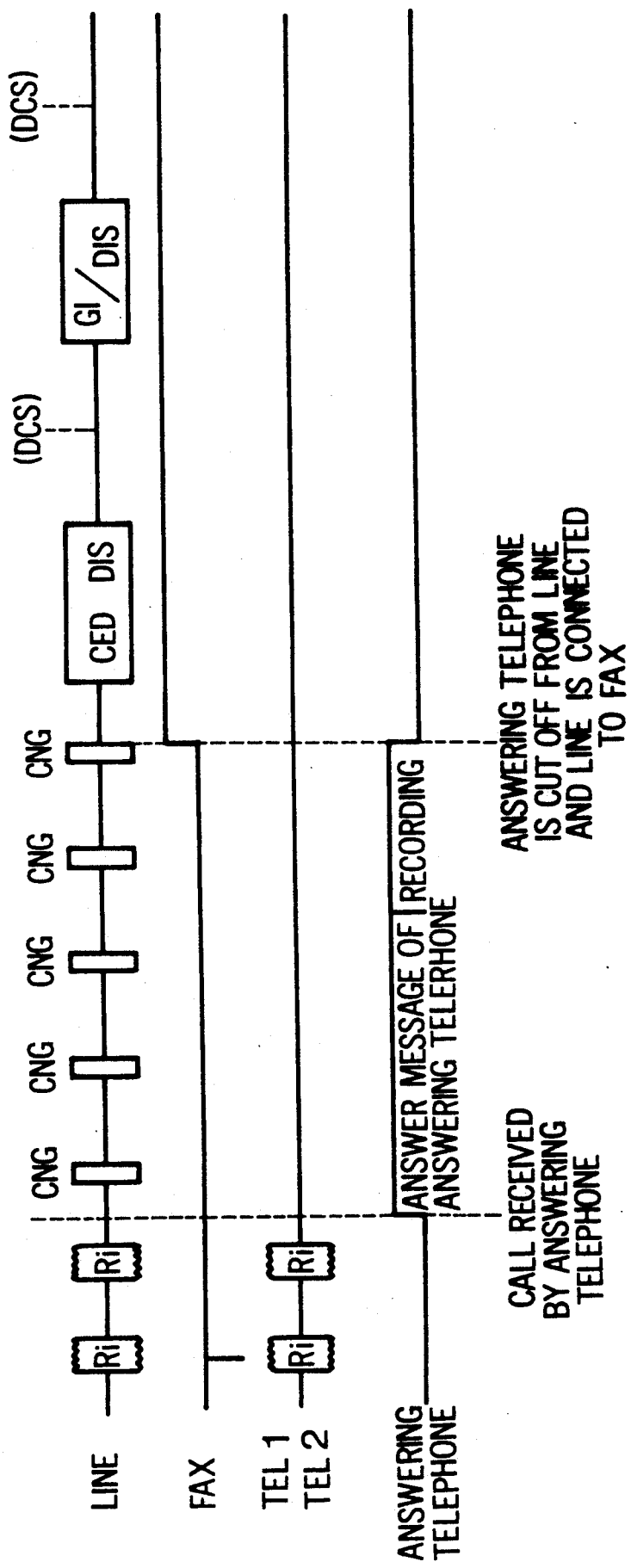
FIG. 4 is a timing chart illustrating a receiving operation in a case where the calling party is sending a facsimile message on an automatic-calling mode.
Figure 5:
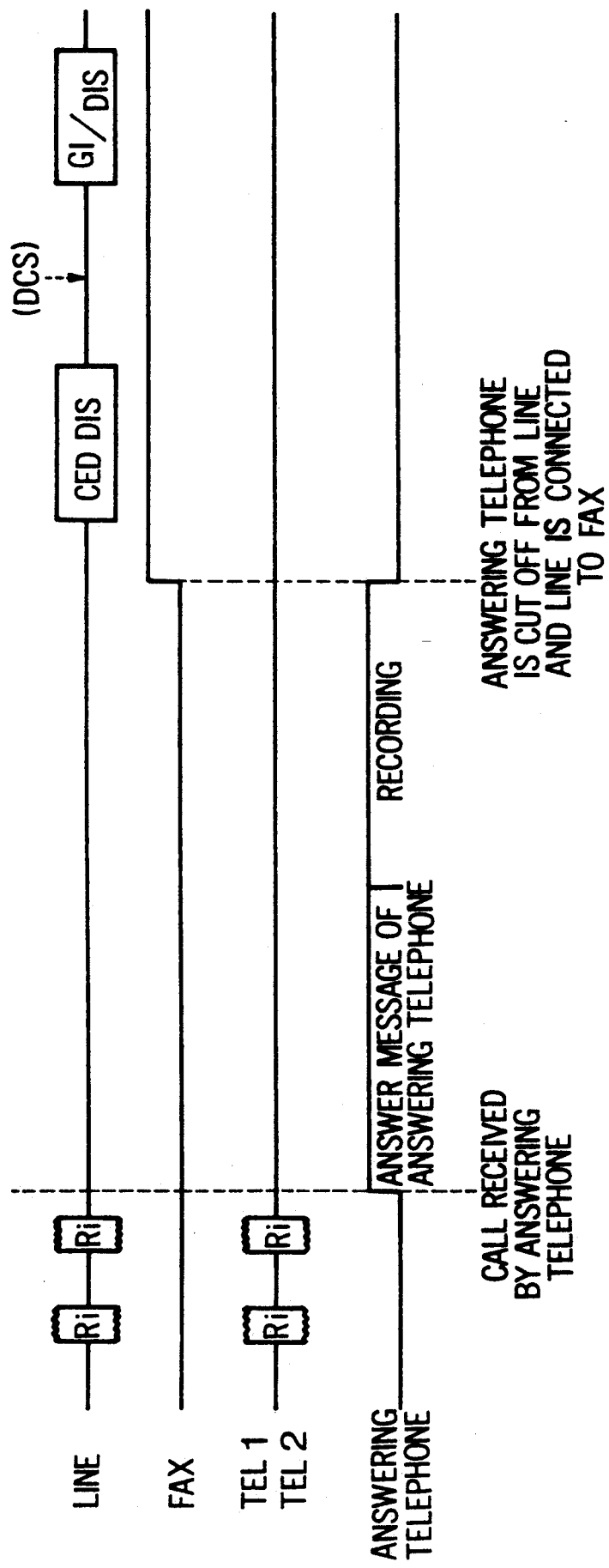
FIG. 5 is a timing chart illustrating a receiving operation in a case where the calling party is sending a facsimile message on a manual-calling mode.
Figure 6:
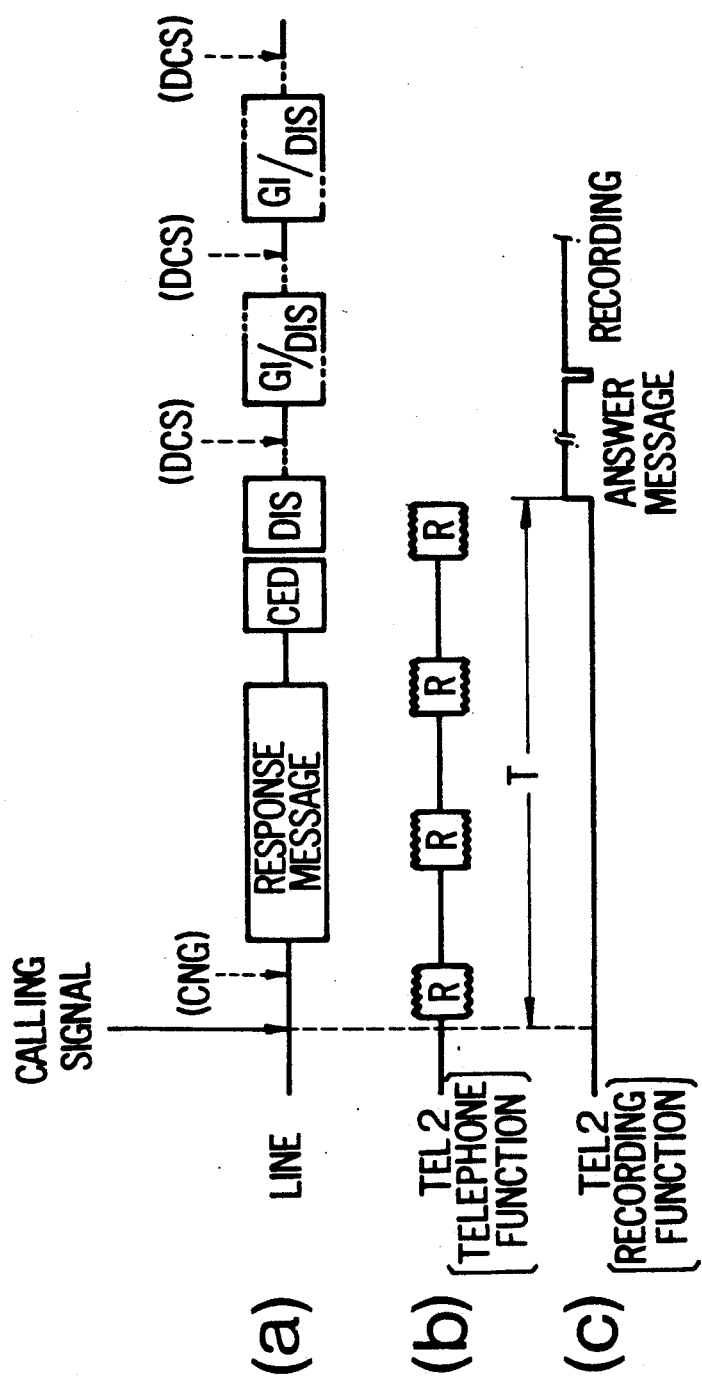
FIG. 6 is a timing chart illustrating procedures for switching the reception by a conventional facsimile arrangement having an automatic answering telephone and facsimile functions.

Timing charts based on the above-described receiving operation are shown in FIG. 4 and 5. FIG. 4 illustrates a case where the calling party is operating on an automatic-calling mode, while FIG. 5 illustrates a case where the calling part is operating on a manual-calling mode. Here, the automatic answering telephone set 6 is set in such a manner as to receive an incoming call upon receipt of two pulses of a call signal.

First, as shown in FIG. 4, when a call signal (Ri) from the calling party's side reaches the called party's side via the telephone line LINE, the incoming call signal is received by the automatic answering telephone set 6, which in turn sends an answer message and then starts recording. Concurrently with the aforementioned reception of the incoming call signal, the facsimile arrangement 1 detects a CNG (ringing tone) signal from the calling party's side. It should be noted that this detection is preferably effected during recording since there is the possibility of the incoming call signal being misjudged as being the 1,100 Hz of speech if it is carried out during transmission of the answer message.

Subsequently, when the CNG signal from the calling party's side is detected by the facsimile arrangement 1, the automatic answering telephone set 6 is cut off from the line 4 and, at the same time, the line 4 is connected to the facsimile unit FAX, thereby starting facsimile reception.

Likewise, as shown in FIG. 5, when the call signal Ri from the calling party's side reaches the called party's side via the line LINE, the call signal is received by the automatic answering telephone set 6, which in turn transmits an answer message and then starts recording. Concurrently with the reception of the incoming call signal, the facsimile apparatus 1 detects the CNG signal from the calling party's side. In this case, however, since the calling party is using the manual mode, the CNG signal is not transmitted. Accordingly, upon completion of the recording by the automatic answering telephone set 6, the automatic answering telephone set 6 is cut off from the line 4 and, at the same time, a confirmation is made that the specific time of the timer has not elapsed (Step S13), and the line 4 is connected to the facsimile unit FAX, thereby starting facsimile reception.

It should be noted that, in the above-described embodiment, the TEL relay switches 27, 28 for switching the connection between the line 4 on the one hand, and the attached telephone set 5 and the automatic answering telephone set 6 on the other, are connected at the positions c, e (on the telephone line side) in the standby state. Accordingly, it is possible to make a call immediately when a call is made through the attached telephone set 5 or received through the automatic answering telephone set 6, thereby improving the operationg efficiency.

We claim:

1. A process for controlling a telephone system having an automatic answering unit and a facsimile unit, comprising the steps of:

detecting an incoming signal, determining whether the incoming signal is a facsimile signal, the step of determining whether the incoming signal is a facsimile signal comprising the steps of;

determining whether the incoming signal includes a speech signal and determining whether the incoming signal includes a CNG signal, whereby the incoming signal is determined to be a facsimile signal when the incoming signal does not include a speech signal and the incoming signal includes a CNG signal, and connecting a telephone line to the automatic answering unit upon detection of the incoming signal regardless of whether the incoming signal is a speech signal or a facsimile signal, detecting whether the automatic answering unit is in an on-hook state or an off-hook state and, before a predetermined time has elapsed after the step of detecting an incoming signal, disconnecting the telephone line from the automatic answering unit and connecting the telephone line with the facsimile unit when the automatic answering unit is in an on-hook state.

2. The process of claim 1, comprising the step of:

disconnecting the telephone line from the automatic answering unit and connecting the telephone line to the facsimile unit upon the detection of a facsimile signal.

3. The process of claim 1, comprising the step of:

disconnecting the telephone line from the automatic answering unit and connecting the telephone line to the facsimile unit when the incoming signal comprises a signal of 1,100 Hz.

4. The process of claim 1, wherein the step of determining whether the incoming signal is a facsimile signal follows the step of detecting an incoming signal by a predetermined length of time.

5. The process of claim 1, wherein the step of detecting an incoming signal comprises the step of detecting an incoming signal of 16 Hz.

6. A telephone system having an automatic answering unit and a facsimile unit, comprising:

incoming signal detection means for detecting an incoming signal, signal determination means for determining whether the incoming signal is a facsimile signal, the signal determination means comprising speech signal determination means for determining whether the incoming signal includes a speech signal and facsimile signal determination means for determining whether the incoming signal includes a CNG signal, whereby the incoming signal is determined to be a facsimile signal when the signal determination means determines that the incoming signal does not include a speech signal and the facsimile signal determination means determines that the incoming signal includes a CNG signal, and reception mode switching means for connecting a telephone line to the automatic answering unit upon detection of the incoming signal regardless of whether the incoming signal is a speech signal or a facsimile signal and for disconnecting the telephone line from the automatic answering unit and connecting the telephone line to the facsimile unit if the incoming signal is a facsimile signal;

wherein the reception mode switching means comprises:

1,100 Hz signal detection means for detecting a 1,100 Hz signal, means for disconnecting the telephone line from the automatinc answering unit and for connecting the telephone line to the facsimile unit when the 1,100 Hz signal detection means detects a signal of 1,100 Hz, a timer for determining whether a predetermined period of time has elapsed after the incoming signal is detected, means for starting the timer upon the detection of the incoming signal, means for maintaining the connection between the telephone line and the automatic answering unit until the timer determines that the predetermined period of time has elapsed, a detector for detecting whether the automatic answering unit is in an on-hook state or an off-hook state, and means for disconnecting the telephone line from the automatic answering unit and for connecting the telephone line to the facsimile unit when the automatic answering unit is in the on-hook state before the elapse of the predetermined time.

7. The device of claim 6, wherein the reception mode switching means comprises means for connecting the telephone line to the automatic answering unit when the incoming signal detecting means detects a signal of 16 Hz.

8. The device of claim 6, wherein the reception mode switching means comprises a relay for disconnecting the telephone line from the automatic answering unit.

* * * * *